United States Patent [19]

Swanson et al.

[11] 3,871,330

[45] Mar. 18, 1975

[54] PROCESS AND APPARATUS FOR THE IMMOBILIZING AND STUDY OF GROWTH ORGANISMS, INCLUDING DROSOPHILA MELANOGASTER

[76] Inventors: H. Damon Swanson; Glenda A. Swanson, both of 88 West St., Concord, N.H. 03301

[22] Filed: Oct. 17, 1973

[21] Appl. No.: 407,175

[52] U.S. Cl. .................................................. 119/1
[51] Int. Cl. ............................................. A01k 1/00
[58] Field of Search .................. 119/1, 15; 195/139

[56] References Cited
UNITED STATES PATENTS

| | | | |
|---|---|---|---|
| 3,128,902 | 4/1964 | Barnum | 195/139 U X |
| 3,203,870 | 8/1965 | Andelin | 195/139 |

*Primary Examiner*—Hugh R. Chamblee
*Attorney, Agent, or Firm*—Rines and Rines; Shapiro and Shapiro

[57] ABSTRACT

This disclosure deals with the immobilizing of growth organisms, such as the fruit fly, through controlled transparent chamber chilling, to enable manipulation and study of the same.

3 Claims, No Drawings

PROCESS AND APPARATUS FOR THE IMMOBILIZING AND STUDY OF GROWTH ORGANISMS, INCLUDING DROSOPHILA MELANOGASTER

The present invention relates to process and apparatus for the immobilizing and study of growth organisms, such as fruit flies and the like (*Drosophila Melanogaster*), being more particularly directed to enabling relatively long periods of access study and manipulation from the ambient environment, while maintaining the organisms well, but safely immobilized.

In copending application Ser. No. 170,252, filed Aug. 9, 1971, now U.S. Pat. No. 3,769,936, for "Organism Growth Chamber and Process," and in an article entitled "A new technique for manipulation and study of *Drosophila Melanogaster*," appearing in the Journal of Heredity, Vol. 62, No. 3, May - June 1971, we described a novel Petri-dish-type transparent chamber adapted to enable in situ observations of behaviors and genetic effects of organisms such as the fruit fly. For these purposes, the growth medium is preferably substantially transparent, eliminating the opacity of corn meal as suggested by Demerec et al, 1969, *Drosophila Guide*, 8th ed., *Carnegie Inst. Wash. Pub.*, and substituting yeast extract substantially as follows:

| | |
|---|---|
| Distilled water | 1000 ml |
| Corn syrup | 100 ml |
| Yeast extract | 20 g |
| Mold inhibitor | 0.1 g |
| Agar | 10 g |
| Neutrient gelatin | 40 g |

While these structures and media have been found to work well in practice, there still remain the problems of (1) initially anesthetizing the flies or other organisms to immobilize them, (2) maintaining them immobilized for the duration of the desired manipulation, study or other experiment, and (3) continually providing convenient observation and external access, as desired. As explained in our said copending application and article, periodic anesthetizing has customarily been effected by needle, tube, or probe introducing carbon dioxide into the chamber, through orifices provided therein. Ether and other anesthetic agents may be similarly employed, but ether has a tendency to sterilize male imagoes and adult males anesthetized a second time. Additionally, such anesthetics and their administration can annoy and be inconvenient to the experimenter.

It is to a solution of this problem that the present invention is primarily directed; it being an object of the present invention to provide a new and improved process and apparatus for immobilizing the organisms without the necessity for the use of such anesthetics, with their attendant disadvantages — and to provide, to the contrary, for more facile and lengthy safe immobilization with ready access to the external environment outside the chamber.

A further object is to provide a novel organism-immobilizing process and apparatus of more general applicability, as well.

Other and further objects will be explained hereinafter and are more particularly delineated in the appended claims. From one of its broader aspects, however, the invention, in summary, contemplates a process for the immobilized manipulation and study of the growth of organisms such as Drosophila Melanogaster and the like, that comprises, disposing a growth medium for the organisms in the base of a flat-lid covered chamber, inserting the organisms within the chamber, inverting the chamber, placing the inverted chamber with the outer surface of its flat lid in contact with a refrigerated surface, maintaining said surface contact until the organisms within the medium and chamber have become cold-immobilized and have fallen under the influence of gravity upon the inner surface of the inverted flat lid, removing the medium-containing base to expose the immobilized organisms on the flat lid inner surface to the exterior environment to enable manipulation and study, and continuing to maintain the organisms immobilized by continuing said contact with the refrigerated surface for the desired period of such manipulation and study. Preferred details and apparatus are hereinafter described.

In view of the simplicity of the structure, it is believed unnecessary to provide an illustrated drawing, reference being had to the citations manetioned herein, particularly since a primary thrust of the invention resides in the discovery of a controlled cold-immobilizing technique that may be effected with a host of well-known types of apparatus.

Specifically, it has been discovered that, without the necessity for anesthetizing by conventional means, as above described, if a cylindrical Petri-dish-type transparent chamber is employed with its removable flat lid cover (as before mentioned and as described in said copending application and article), the rapid cooling of the lid by conduction and circulating convection after inversion of the chamber, can provide a harmless and repeatable cold-immobilization of the fruit flies or the like, obviating the necessity for such other anesthetizing procedures — and over prolonged time periods, and with the desirable advantage of exposure and access to and from the ambient environment external to the chamber.

If the flat lid of the inverted covered Petri-type dish, containing the before described growth medium adhered to its base, is placed in cold-transfer contact with a refrigerated correspondingly flat cylindrical surface, such that uniform cold conduction into the chamber is effected over the whole cross section thereof, and preferably supplemented by cold air circulation, through small vent apertures in the lid (too small to allow the escape of the flies or other organisms dispersed within the chamber), it has been found that the flies will become cold-immobilized within a minute or more, and will fall under the influence of gravity from the growth medium to the inside surface of the chilled lid. The appropriate consistency growth medium will, of course, resist gravitational forces and remain adhered to the base of the dish, permitting observation in view of its transparency. More than this, the rate of continued cooling can maintain the flies thus immobilized with safety if the dish is detached from the lid to expose the inside surface to the ambient external environment, enabling access and manipulation at will for prolonged periods of time, but avoiding freezing or otherwise cold damaging the flies.

When the experiment is concluded, the dish may be replaced upon the lid, the inverted closed chamber removed from the refrigerated surface, and as the organisms recover from their cold-immobilization, the chamber may be righted to enable the conventional monitoring of the recovered organisms at the growth medium.

Suitable plastic gel refrigerant containers include polyethylene "Cold Stat" cups, such as the Type 7406 marketed by Markson Science Inc. of Delmar, California and described at page 14 of their 1972 catalog; though other well-known refrigerating surfaces may clearly be used. Operation with a polystyrene cylindrical container about 45 mm. high and 100 mm. in diameter, containing about 30 mm of super-coolant refrigerant plastic gel covered by a flat polystyrene circular cover, produced a uniformly refrigerated planar surface approximately 12° F colder than obtainable with ice, with far less expansion that attainable with ice, and capable of retaining its solid state at room temperature for at least an hour and a half. Tests demonstrated the cold-immobilizing of Drosophila within an inverted Petri-dish, as above described, of about 100 mm diameter and about 15 mm in height, in about 90 seconds after face-to-face planar contact of the lid with the container cover. The system was operated for over ninety minutes with the dish-base removed and the inactivated flies exposed to the ambient temperature exterior environment, with a recovery time of immobilized flies transferred to an ambient environment of about two minutes to regain complete mobile ability.

Further modifications will occur to those skilled in this art, and are considered to fall within the spirit and scope of the invention as defined in the appended claims.

What is claimed is:

1. A process for the immobilized manipulation and study of the growth of organisms such as Drosophila Melanogaster and the like, that comprises, disposing a growth medium for the organisms in the base of a flat-lid covered chamber, inserting the organisms within the chamber, inverting the chamber, placing the inverted chamber with the outer surface of its flat lid in contact with a refrigerated surface, maintaining said surface contact until the organisms within the medium and chamber have become cold-immobilized and have fallen under the influence of gravity upon the inner surface of the inverted flat lid, removing the medium-containing base to expose the immobilized organisms on the flat lid inner surface to the exterior environment to enable manipulation and study, and continuing to maintain the organisms immobilized by continuing said contact with the refrigerated surface for the desired period of such manipulation and study.

2. A process as claimed in claim 1 and in which the cooling from said refrigerated surface enters the chamber both by conduction through the flat lid thereof and by circulation through venting in said flat lid.

3. A process as claimed in claim 1 and in which the further steps are performed of replacing the medium-containing base upon the flat lid, withdrawing the chamber from contact with said refrigerated surface, and, as the organisms recover from their cold-immobilizing, turning the chamber upright to enable monitoring of the organisms at the growth medium.

* * * * *